(12) United States Patent
Zhou et al.

(10) Patent No.: US 10,767,634 B2
(45) Date of Patent: Sep. 8, 2020

(54) BLADE ICING STATE IDENTIFICATION METHOD AND APPARATUS FOR WIND GENERATOR SET

(71) Applicant: BEIJING GOLDWIND SCIENCE & CREATION WINDPOWER EQUIPMENT CO., LTD., Daxing District, Beijing (CN)

(72) Inventors: Jie Zhou, Beijing (CN); Chi Yu, Beijing (CN); Jianjun Yang, Beijing (CN)

(73) Assignee: BEIJING GOLDWIND SCIENCE & CREATION WINDPOWER EQUIPMENT CO., LTD., Daxing District, Beijing (CN)

( * ) Notice: Subject to any disclaimer, the term of this patent is extended or adjusted under 35 U.S.C. 154(b) by 65 days.

(21) Appl. No.: 15/741,912

(22) PCT Filed: Jul. 6, 2017

(86) PCT No.: PCT/CN2017/092073
§ 371 (c)(1),
(2) Date: Jan. 4, 2018

(87) PCT Pub. No.: WO2018/099083
PCT Pub. Date: Jun. 7, 2018

(65) Prior Publication Data
US 2019/0003461 A1   Jan. 3, 2019

(30) Foreign Application Priority Data
Nov. 29, 2016   (CN) .......................... 2016 1 1078317

(51) Int. Cl.
*F03D 9/00* (2016.01)
*F03D 17/00* (2016.01)
(Continued)

(52) U.S. Cl.
CPC ........... *F03D 17/00* (2016.05); *F03D 1/0675* (2013.01); *F03D 3/005* (2013.01); *F03D 9/25* (2016.05);
(Continued)

(58) Field of Classification Search
CPC ........ F03D 17/00; F03D 1/0675; F03D 80/40; F05B 2270/32
(Continued)

(56) References Cited

U.S. PATENT DOCUMENTS 6,890,152 B1 * 5/2005 Thisted ................... F03D 80/40
416/1
8,866,323 B2 * 10/2014 Nielsen ..................... F03D 7/00
290/44
(Continued)

FOREIGN PATENT DOCUMENTS

CN    202280571 U    6/2012
CN    102817780 A    12/2012
(Continued)

OTHER PUBLICATIONS

International Search Report dated Oct. 11, 2017; PCT/CN2017/092073 A English Translation is Not Yet Available on the WIPO Website.
(Continued)

*Primary Examiner* — Julio C. Gonzalez

(57) ABSTRACT

A blade icing state identification method and apparatus for a wind generator set are disclosed. The method includes setting a preset wind speed threshold and a preset rotating speed threshold, and setting the preset rotating speed threshold as a lower limit value of a maximum limited rotating speed of the wind generator set operating under a limited power condition; comparing a current wind speed and a current rotating speed of the wind generator set with the
(Continued)

preset thresholds respectively; progressively increasing a blade icing possibility index when the current wind speed is greater than the preset wind speed threshold and the current rotating speed of the wind generator set is smaller than the preset rotating speed threshold, and otherwise, progressively decreasing the blade icing possibility index; and determining that blades are in an icing state when the blade icing possibility index is greater than a preset index.

10 Claims, 5 Drawing Sheets

(51) Int. Cl.
    *F03D 80/40*     (2016.01)
    *F03D 1/06*     (2006.01)
    *F03D 9/25*     (2016.01)
    *F03D 3/00*     (2006.01)
    *F03D 7/04*     (2006.01)

(52) U.S. Cl.
    CPC .............. *F03D 80/40* (2016.05); *F03D 7/047* (2013.01); *F03D 7/048* (2013.01); *F05B 2270/32* (2013.01); *F05B 2270/327* (2013.01); *Y02E 10/722* (2013.01)

(58) Field of Classification Search
    USPC ........................................ 290/44, 55; 416/39
    See application file for complete search history.

(56) References Cited

U.S. PATENT DOCUMENTS

| | | | | |
|---|---|---|---|---|
| 8,941,253 | B2* | 1/2015 | Christiansen | ............. F03D 7/04 290/44 |
| 2005/0276696 | A1* | 12/2005 | LeMieux | .................. F03D 7/02 416/61 |
| 2010/0143127 | A1* | 6/2010 | Ahmann | .................. F03D 80/40 416/61 |
| 2012/0134804 | A1* | 5/2012 | Magnuson | ............ F03D 7/0272 416/1 |
| 2012/0175878 | A1* | 7/2012 | Wickstrom | ............. F03D 80/40 290/44 |
| 2012/0226485 | A1 | 9/2012 | Creagh et al. | |
| 2013/0078093 | A1 | 3/2013 | Miranda et al. | |
| 2015/0292486 | A1 | 10/2015 | Zhou et al. | |
| 2016/0027294 | A1 | 1/2016 | Magnus | |
| 2017/0226990 | A1* | 8/2017 | Arlaban Gabeiras | ... F03D 17/00 |

FOREIGN PATENT DOCUMENTS

| | | |
|---|---|---|
| CN | 103603769 A | 2/2014 |
| CN | 104066983 A | 9/2014 |
| CN | 104454386 A | 3/2015 |
| CN | 104832371 A | 8/2015 |
| CN | 105089929 A | 11/2015 |
| CN | 105508152 A | 4/2016 |
| DE | 102011077129 A1 | 12/2012 |
| WO | 2011/131522 A2 | 10/2011 |
| WO | 2012/119061 A1 | 9/2012 |

OTHER PUBLICATIONS

The First Australian Office Action dated Dec. 7, 2018; Appln. No. 2017294578.
The First Chinese Office Action dated Jan. 22, 2019; Appln. No. 201611078317.2.
Extended European Search Report dated Jun. 26, 2019; Appln. No. 17818415.6.
The Second Chinese Office Action dated Aug. 8, 2019; Appln. No. 201611078317.2.
Jie Chen, et al; "Active Stall Control of Fixed-Pitch Wind Turbines", Dianli Xitong Zidonghua/Automation of Electric Power Systems 34(2): 98-103, Jan. 2010.

* cited by examiner

BLADE ICING STATE IDENTIFICATION METHOD AND APPARATUS FOR WIND GENERATOR SET

CROSS-REFERENCE TO RELATED APPLICATION

This application is based upon and claims priority to Chinese Patent Application No. 201611078317.2, filed on Nov. 29, 2016, the content of which is incorporated herein by reference in its entirety.

TECHNICAL FIELD

The present application generally relates to the field of wind power generation technology, and in particular to a blade icing state identification method and apparatus for a wind generator set.

BACKGROUND

With the continuous development of the wind power generation technology, wind generator sets have now been widely used. Under certain conditions, a limited power control may be applied to a wind generator set. The limited power control may be understood as that when a torque of the wind generator set reach a rated torque, constant power output of the wind generator set is realized through pitch control.

At present, there is no effective identification apparatus or method for blade icing states under the limited power condition. However, it has become an ordinary state that wind generator sets operate under the limited power condition in some of wind farms, and meanwhile in winter, there are a large number of blades iced up in the wind farms.

SUMMARY

The present application provides a blade icing state identification method and apparatus for a wind generator set.

In a first aspect, a blade icing state identification method for a wind generator set is provided in an embodiment of the present application. The method may include setting a preset wind speed threshold and a preset rotating speed threshold, and setting the preset rotating speed threshold as a lower limit value of a maximum limited rotating speed of the wind generator set operating under a limited power condition; obtaining a current wind speed and a current rotating speed of the wind generator set, and comparing the current wind speed and the current rotating speed of the wind generator set with the preset wind speed threshold and the preset rotating speed threshold respectively; progressively increasing a blade icing possibility index when the current wind speed is greater than the preset wind speed threshold and the current rotating speed of the wind generator set is smaller than the preset rotating speed threshold, and otherwise, progressively decreasing the blade icing possibility index; and determining that blades are in an icing state when the blade icing possibility index is greater than a preset index, wherein the preset rotating speed threshold is greater than a minimum rotating speed of the wind generator set.

In a second aspect, a blade icing state identification apparatus for a wind generator set is provided in an embodiment of the present application. The apparatus may include a threshold setting module, configured to set a preset wind speed threshold and a preset rotating speed threshold, and set the preset rotating speed threshold as a lower limit value of a maximum limited rotating speed of the wind generator set operating under a limited power condition; an icing possibility index determination module, configured to obtain a current wind speed and a current rotating speed of the wind generator set, compare the current wind speed and the current rotating speed of the wind generator set with the preset wind speed threshold and the preset rotating speed threshold respectively, progressively increase a blade icing possibility index when the current wind speed is greater than the preset wind speed threshold and the current rotating speed of the wind generator set is smaller than the preset rotating speed threshold, and otherwise, progressively decrease the blade icing possibility index; and an icing determination module configured to determine that blades are iced up when the blade icing possibility index is greater than a preset index, wherein the preset rotating speed threshold is greater than a minimum rotating speed of the wind generator set.

In a third aspect, a blade icing state identification device for a wind generator set is provided in an embodiment of the present application. The device may include a memory for storing computer executable instructions; and a processor for executing the computer executable instructions stored in the memory, wherein the computer executable instructions cause the processor to carry out the above described blade icing state identification method for the wind generator set.

BRIEF DESCRIPTION OF THE DRAWINGS

To illustrate technical solutions in the embodiments of the present application more clearly, the accompanying drawings which are needed in the embodiments of the present application are introduced briefly. Apparently, the accompanying drawings in the description below are merely illustrating some of the embodiments of the present application, based on which other accompanying drawings can be obtained by those of ordinary skill in the art without any creative effort.

DETAILED DESCRIPTION

In order to make embodiments of the present application more apparent, a clear and complete description of embodiments of the present application will be given below in combination with the accompanying drawings. Apparently, the embodiments described below are merely a part, but not all, of the embodiments of the present application. All of other embodiments, obtained by those of ordinary skill in the art based on the embodiments in the present application without any creative effort, fall into the protection scope of the present application.

In the case of no conflict, the embodiments in the present application and the features in the embodiments may be combined with one other. The present application will be described in detail below with reference to the accompanying drawings in combination with the embodiments.

Figure 1:
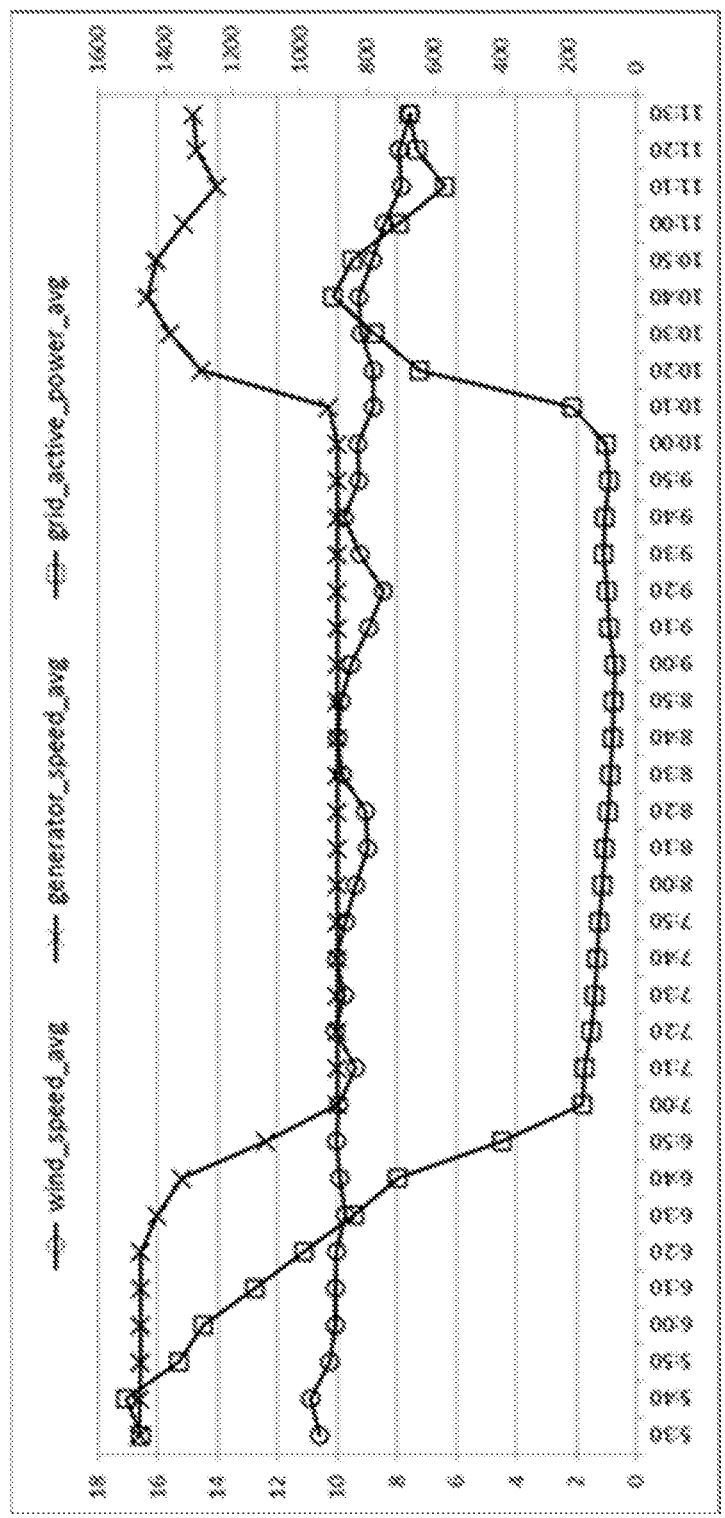
FIG. 1 is a schematic diagram of an operation parameter curve of a wind generator set in a blade icing state according to an embodiment of the present application.

FIG. 1 is a schematic diagram of an operation parameter curve of a wind generator set in a blade icing state according to an embodiment of the present application. As shown in FIG. 1, the schematic diagram of the curve is the operation parameter curve of the wind generator set with rated power of 1500 kW, wherein a horizontal axis represents a time axis, a hollow dot curve represents a 10-minute average wind speed (wind-speed-avg) located on a primary axis (the vertical axis represents a speed axis on the left), a cross point curve represents a 10-minute average rotating speed of the generator set (generator-speed-avg) located on the primary axis (the vertical axis represents a rotating speed axis on the left), and a square point curve represents 10-minute average power (gird-active-power-avg) located on a secondary axis (the vertical axis represents a power axis on the right). As shown in FIG. 1, within the time period of severe icing from 7 o'clock to 10 o'clock, blades of the generator set are in a serious stalling state: for example, at a wind speed close to 10 m/s, the rotating speed of the generator set is maintained at the minimum rotating speed 10 rpm, and the power is lower than 200 kW. The main features of the generator set in the severe icing state are as follows: under the condition of a relatively high wind speed, the rotating speed of the generator set is close to the minimum rotating speed due to the stalling of the blades, and the power of the generator set drops with the rotating speed. The relatively high wind speed herein means that at this wind speed, the operation parameters of the generator set under the icing or limited power condition are significantly different from the operation parameters not under the icing or limited power condition. For example, the relatively high wind speed can be 10 m/s. At this wind speed, if the generator set is not in the icing state, the rotating speed of the generator set is the maximum rotating speed; if the blades stall due to the severe icing, the rotating speed may drop to the minimum rotating speed. Alternatively, at this wind speed, if the power is not limited, taking the above-mentioned wind generator set with the rated power of 1500 kW as an example, the power of the generator set is the power in a free power generation state (for example, 1200 kW) and the rotating speed of the generator set is the maximum rotating speed; and if a limited power value is a relatively low power, for example 400 kW, then the actual power of the generator set is 400 kW, and the rotating speed of the generator set is a low rotating speed corresponding to the limited power value 400 kW. The maximum rotating speed and the minimum rotating speed herein can be understood as the own attributes of the wind generator set.

Figure 2:
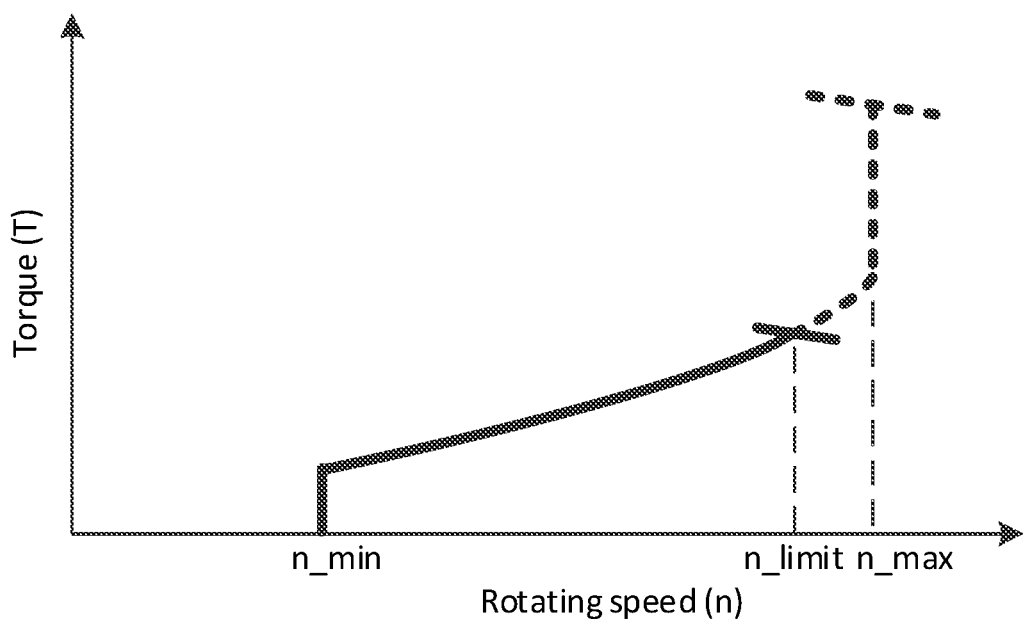
FIG. 2 is a schematic diagram of a torque-rotating speed characteristic curve of a wind generator set under a limited power condition according to an embodiment of the present application.

FIG. 2 is a schematic diagram of a torque-rotating speed characteristic curve of a wind generator set under a limited power condition according to an embodiment of the present application. As shown in FIG. 2, the horizontal coordinate represents the rotating speed and is denoted by the letter n, and the vertical coordinate represents the torque and is denoted by the letter T. The maximum limited rotating speed of the wind generator set operating under the limited power condition can be denoted by $n\_limit$ and is determined by the limited power value. When the wind generator set works under the limited power condition, at the relatively high wind speed, the rotating speed of the generator set is limited to $n\_limit$, and the power is limited to the power corresponding to $n\_limit$; while at a relatively low wind speed, the wind generator set is in the free power generation state, and the rotating speed is between the minimum rotating speed and the maximum limited rotating speed. The minimum rotating speed herein is denoted by $n\_min$, and the maximum limited rotating speed is denoted by $n\_limit$. In the embodiment of the present application, a preset wind speed threshold is set in advance. The wind speed greater than the preset wind speed threshold can be understood as the relatively high wind speed mentioned above, while the wind speed smaller than the preset wind speed threshold can be understood as the relatively low wind speed mentioned above. The preset wind speed threshold is used as a judging condition for the identification of the blade icing state. In an example, the preset wind speed threshold may be manually set according to experience, or may be calculated by the following way: multiplying a wind speed value corresponding to the minimum torque of a constant rotating speed section in which the rotating speed is a preset maximum rotating speed $n\_max$ in the torque-rotating speed characteristic curve under the limited power condition by a preset coefficient.

Figure 3:
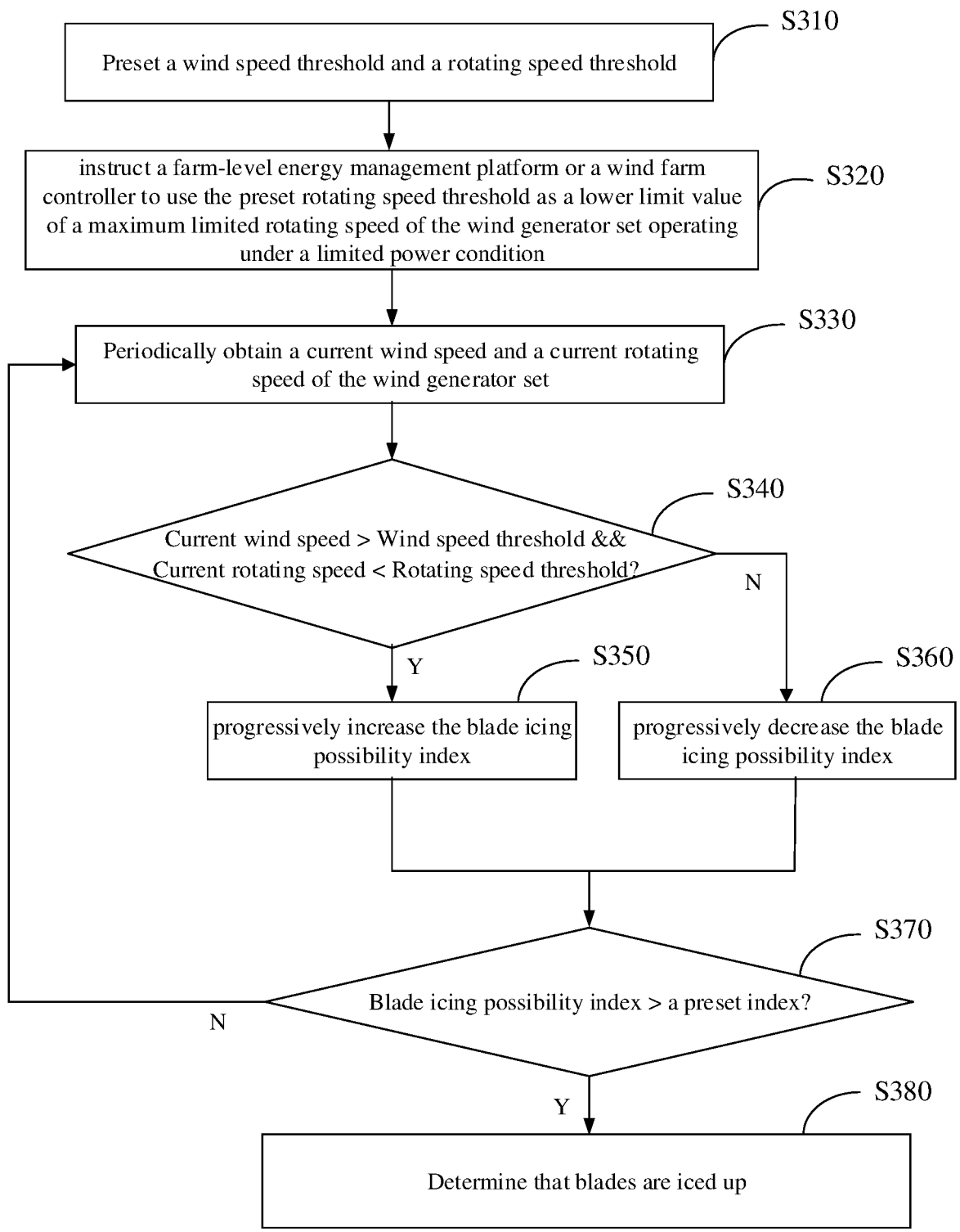
FIG. 3 is a flowchart of a blade icing state identification method for a wind generator set according to an embodiment of the present application.

FIG. 3 is a flowchart of a blade icing state identification method for a wind generator set according to an embodiment of the present application. The method may include steps S310 to S380. At S310, a wind speed threshold and a rotating speed threshold may be preset, for example, according to experience. At S320, a farm-level energy management platform or a wind farm controller may be instructed to use the preset rotating speed threshold as a lower limit value of a maximum limited rotating speed of the wind generator set operating under a limited power condition. The farm-level energy management platform or the wind farm controller may adjust a limited power value delivered to the wind generator set in real time according to the maximum limited rotating speed of the wind generator set operating under the limited power condition. At S330, a current wind speed and a current rotating speed of the wind generator set may be obtained periodically. At S340, the obtained current wind speed and the obtained current rotating speed may be compared with the preset wind speed threshold and the preset rotating speed threshold respectively. At S350, when a condition that the current wind speed is greater than the preset wind speed threshold and the current rotating speed of the wind generator set is smaller than the preset rotating speed threshold is met, a blade icing possibility index having a preset initial value may be progressively increased. At S360, when said condition is not met, the blade icing possibility index may be progressively decreased. At S370, the blade icing possibility index may be compared with a preset index. At S380, when the blade icing possibility index is greater than the preset index, it may be determined that blades are iced up. Otherwise, the method may continue to periodically obtain the current wind speed and the current rotating speed of the wind generator set at S330. The preset rotating speed threshold is greater than the minimum rotating speed of the generator set. For example, the preset rotating speed threshold is denoted by $n\_min+k \times n0$, wherein the value of k is between 0 and 1, for example, $k=0.5$.

On the basis of the embodiment as shown in FIG. 3, the method may further include: monitoring/receiving an external environment index of the generator set, and comparing the external environment index of the generator set with a blade icing induction index to determine whether the external environment index of the generator set satisfies an icing induction condition. When it is determined that the external environment index of the generator set meets the blade icing induction index, the flow of the method as shown in FIG. 3 is started. In an example, the external environment index of the generator set may be obtained in multiple manners. In an example, the external environment index of the generator set may be obtained by a sensor arranged outside of the generator set. In an example, the external environment index of the generator set may also be acquired from a database including the external environment index of the generator set, and a manually input measured external environment index of the generator set may also be directly received. In an example, the external environment index of the generator set may include temperature and humidity. For example, when the external environment temperature of the generator set is lower than 5° C. and the relative humidity is higher than 90%, the blade icing state identification method as shown in FIG. 3 is started to be executed.

According to an embodiment, the preset rotating speed threshold set in step S310 may be greater than the minimum rotating speed of the generator set and is smaller than an intermediate value between the minimum rotating speed and the maximum rotating speed of the generator set. It should be understood that the minimum rotating speed and the maximum rotating speed herein may be the minimum rotating speed and the maximum rotating speed corresponding to end points in the torque-rotating speed characteristic curve of the wind generator set in FIG. 2. In an example, a value n0 may be set, and then the preset rotating speed threshold n_ref may be denoted by the maximum rotating speed n_min+n0. The value n0 may be set to make n_ref closer to n_min than n_max. A function of the preset rotating speed threshold n_ref is to serve as a condition for determining the blade icing state of the generator set, and the other function is to set a lower limit value for the maximum limited rotating speed n_limit of the generator set operating under the limited power condition. When n_limit is greater than n_ref, n_limit may not be limited by n_ref; and when n_limit is smaller than n_ref, n_limit is assigned as n_ref. In an example, after n_limit is modified by n_ref, the modified n_limit may be sent to a farm-level energy management platform of wind generator sets. The farm-level energy management platform may adjust the limited power value delivered to a single wind generator set in real time according to the actual value of n_limit, so as to avoid the situation that the single wind generator set is not controlled by the farm-level energy management platform. In an example, the modified n_limit may also be sent to a wind farm controller, which, for example, may be a wind farm controller having functions of controlling a wind farm and regulating normal powers. The method in the abovementioned embodiment may be executed by the wind farm controller. For example, a plurality of wind generator sets in the wind farm may be selected to perform the control of the abovementioned method so as to identify the blade icing state.

Once the wind generator set is controlled by the abovementioned method, at a relatively high wind speed, that is, when the current wind speed is greater than the preset wind speed threshold, if the blades do not seriously stall due to icing, the rotating speed will not be lower than the preset wind speed threshold no matter the generator set is in the limited power state or not; if the blades seriously stall due to icing, the rotating speed will drop below the preset wind speed threshold, in which case the resistance of the blades is much larger than the lift and the icing load of the blades is very large, which seriously affects lives of the blades. In an example, the preset wind speed threshold is smaller than the wind speed value corresponding to the minimum torque of the constant rotating speed section in which the rotating speed is the preset maximum rotating speed n_max in the torque-rotating speed characteristic curve of the wind generator set under the limited power condition. In an example, the preset wind speed threshold may be obtained by multiplying the wind speed value corresponding to the minimum torque of the constant rotating speed section in which the rotating speed is the preset maximum rotating speed n_max in the torque-rotating speed characteristic curve based on the wind speed under the limited power condition by the preset coefficient. In an example, the value of the preset coefficient herein may be between 0.5 and 1, e.g. 0.8. Under the condition of a relatively low wind speed, the rotating speed may be lower than the preset rotating speed threshold no matter whether the blades are iced or not. In this case, even if the blades are in the icing state, the generator set may continue to operate since the icing load of the blades may be relatively small. Alternatively, the icing state may be detected in other manners, for example, by considering a power-wind speed mismatch. As the judgment method by considering the power-wind speed mismatch under the condition of the relatively low wind speed is simple, no detailed description will be given in the embodiment of the present application. However, it does not prevent the combined implementation of the blade icing state identification method of the present application and the blade icing state identification method at the relatively low wind speed mentioned above.

On the basis of the embodiment as shown in FIG. 3, the preset index in S330 may be determined based on an updating period of the blade icing possibility index. The updating period of the blade icing possibility index is an execution period of the method in the above described embodiment and is usually a few milliseconds to tens of milliseconds. Every update of the blade icing possibility index may represent the blade icing risk at that moment. During the determination of the blade icing state, it may be determined that the blades are iced up only when the blades keep in a state of relatively high icing risk within a certain period of time. Therefore, the period of time for the determination may be specifically defined by setting the preset index. For example, a counter may be set and initialized to 0. When the wind speed is greater than the preset wind speed threshold and the current rotating speed of the set is smaller than the preset rotating speed threshold, the value of the counter may be increased by 1; otherwise, the value may be decreased by 1. Then the determination may be carried out based on the value of the counter. If the value of the counter exceeds a limit value, it may be determined that the blades are iced up. In an example, when the value of the counter is smaller than 0, the value of the counter is limited to 0. If the period of time for the determination is defined to be 10 minutes, the preset index may be set to be tens of thousands to hundreds of thousands.

With the blade icing state identification method for the wind generator set according to the embodiment as shown in FIG. 3, the lower limit value of the maximum limited rotating speed is set for the wind generator set under the limited power condition so as to effectively distinguish the low rotating speed value under the limited power condition from the low rotating speed value during stalling caused by icing. In this way, it may be effectively determined whether the wind generator set is in the blade icing state while operating under the limited power condition, thus avoiding the risk of failure of the wind generator set due to being unable to identify the icing state. No matter the generator set is in the limited power state or a normal operation state, the blade icing state may be accurately identified during serious stalling caused by blade icing at the relatively high wind speed.

Figure 4:
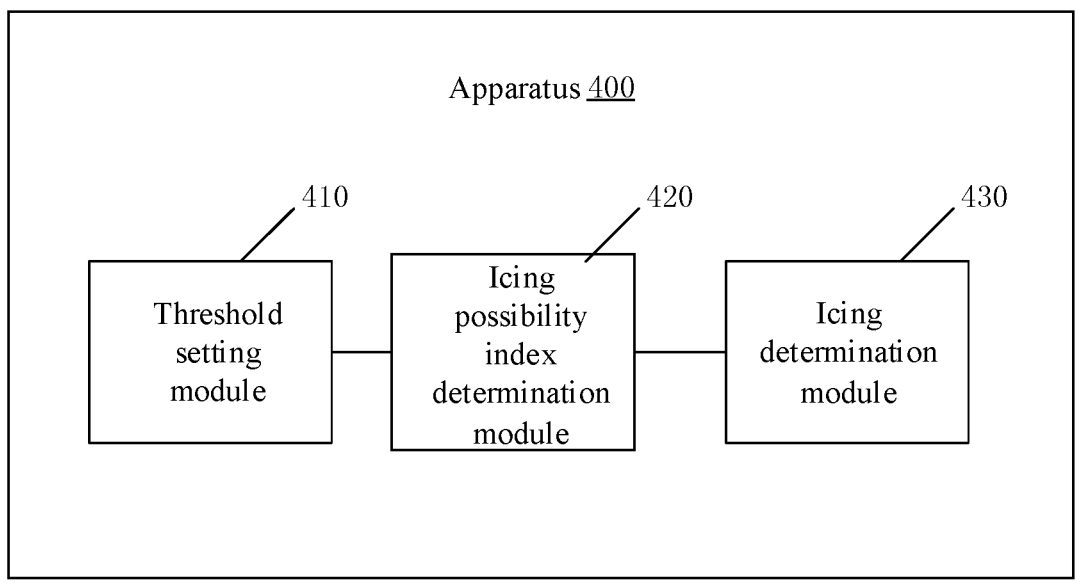
FIG. 4 is a schematic block diagram of a blade icing state identification apparatus for a wind generator set according to an embodiment of the present application.

FIG. 4 is a schematic block diagram of a blade icing state identification apparatus for a wind generator set according to an embodiment of the present application. The blade icing state identification apparatus 400 includes a threshold setting module 410, an icing possibility index determination module 420 and an icing determination module 430. The threshold setting module 410 is configured to set a preset wind speed threshold and a preset rotating speed threshold, and set the preset rotating speed threshold as a lower limit value of the maximum limited rotating speed of the wind generator set operating under a limited power condition. The icing possibility index determination module 420 is configured to obtain a current wind speed and a current rotating speed of the wind generator set and compare the current wind speed and the current rotating speed of the wind generator set with the preset wind speed threshold and the preset rotating speed threshold respectively. When the current wind speed is greater than the preset wind speed threshold and the current rotating speed of the wind generator set is smaller than the preset rotating speed threshold, the icing possibility index determination module 420 progressively increases a blade icing possibility index. Otherwise, the icing possibility index determination module 420 progressively decreases the blade icing possibility index. The icing determination module 430 is configured to determine that blades are iced up when the blade icing possibility index is greater than a preset index. Here, the preset rotating speed threshold is greater than the minimum rotating speed of the generator set. In an example, the apparatus further includes an environment determination module, configured to monitor/receive an external environment index of the generator set, compare the external environment index of the generator set with a blade icing induction index to determine whether the external environment index of the generator set satisfies an icing induction condition. When it is determined that the external environment index of the generator set meets the blade icing induction index, the environment determination module may notify the threshold setting module to set the preset wind speed threshold and the preset rotating speed threshold and to set the preset rotating speed threshold as the lower limit value of the maximum limited rotating speed of the wind generator set operating under the limited power condition. The external environment index of the generator set may include temperature and humidity. In an example, the preset rotating speed threshold may be greater than the minimum rotating speed of the generator set and smaller than an intermediate value between the minimum rotating speed and the maximum rotating speed of the generator set. In an example, the preset rotating speed threshold is smaller than the wind speed value corresponding to the minimum torque of the constant rotating speed section of the preset maximum rotating speed in the torque-rotating speed characteristic curve of the generator set under the limited power condition. In an example, the preset index may be determined according to the updating period of the blade icing possibility index.

The blade icing state identification apparatus 400 for the wind generator set according to the embodiment of the present application may correspond to an executor of the blade icing state identification method for the wind generator set according to the embodiment of the present application. The above mentioned and other operations and/or functions of various modules in the blade icing state identification apparatus 400 for the wind generator set respectively aim at realizing the corresponding processes of the method in FIG. 3, and thus will not be repeated herein for the purpose of conciseness.

With the blade icing state identification apparatus for the wind generator set according to the embodiment of the present application, the lower limit value of the maximum limited rotating speed is set for the wind generator set under the limited power condition so as to effectively distinguish the low rotating speed value under the limited power condition from the low rotating speed value during stalling caused by icing. In this way, it may be effectively determined whether the wind generator set is in the blade icing state while operating under the limited power condition, thus avoiding the risk of failure of the wind generator set due to being unable to identify the icing state. No matter the generator set is in the limited power state or a normal operation state, the blade icing state may be accurately identified during serious stalling caused by blade icing at the relatively high wind speed.

Figure 5:
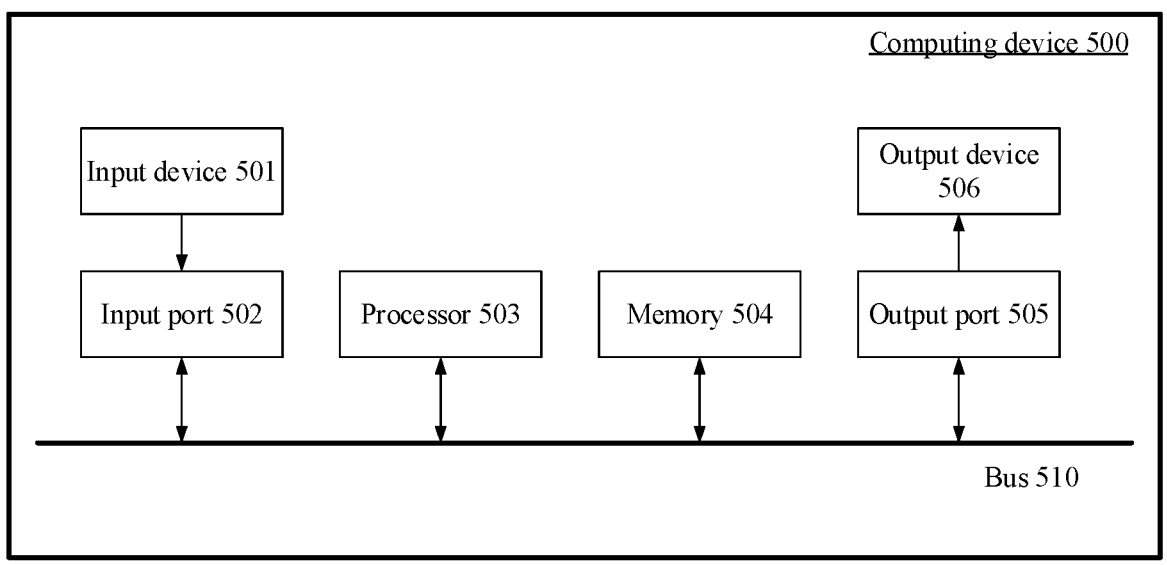
FIG. 5 is a schematic block diagram of a computing device implementation of a blade icing state identification apparatus for a wind generator set according to an embodiment of the present application.

FIG. 5 is a schematic block diagram of a blade icing state identification apparatus for a wind generator set according to an embodiment. As shown in FIG. 5, at least a part of the blade icing state identification method for the wind generator set and the blade icing state identification apparatus for the wind generator set described with reference to FIG. 3 and FIG. 4 may be implemented by a computing device 500. The computing device 500 may include an input device 501, a processor 503 and a memory 504. The memory 504 is used for storing computer executable instructions; the processor 503 is used for executing the computer executable instructions stored in the memory, and the computer executable instruction causes the processor to execute the blade icing state identification method for the wind generator set mentioned above; and the input device 501 is used for obtaining the current wind speed and the current rotating speed of the generator set. In an example, the computing device 500 may further include an input port 502, an output port 505 and an output device 506. The input port 502, the processor 503, the memory 504, and the output port 505 are connected to one another through a bus 510; and the input device 501 and the output device 506 are connected to the bus 510 through the input port 502 and the output port 505 respectively so as to be connected with other components of the computing device 500. The output interface and the input interface may be denoted by I/O interfaces. Specifically, the input device 501 receives input information from the outside and transmits the input information to the processor 503 through the input port 502; the processor 503 processes the input information based on the computer executable instructions stored in the memory 504 to generate output information, temporarily or permanently stores the output information in the memory 504, and then transmits the output information to the output device 506 through the output port 505; and the output device 506 outputs the output information to the outside of the computing device 500.

The above mentioned memory 504 includes a mass memory for storing data or instructions. By way of example, rather than limiting, the memory 504 may include an HDD, a floppy disk drive, a flash memory, an optical disk, a magneto-optical disk, a magnetic tape or a universal serial bus (USB) drive or a combination of two or more thereof. Under appropriate conditions, the memory 504 may include a removable or non-removable (or fixed) medium. Under appropriate conditions, the memory 504 may be located at the inside or outside of the computing device 500. In a particular embodiment, the memory 504 is a non-volatile solid state memory. In a particular embodiment, the memory 504 includes a read only memory (ROM). Under appropriate conditions, the ROM may be a mask-programmed ROM, a programmable ROM (PROM), an erasable PROM (EPROM), an electrically erasable PROM (EEPROM), an electrically rewritable ROM (EAROM) or flash memory or a combination of two or more thereof.

The bus 510 includes hardware, software or both and couples the components of the computing device 500 together. By way of example, rather than limiting, the bus 510 may include an accelerated graphics port (AGP) or other graphics bus, an enhanced industry standard architecture (EISA) bus, a front side bus (FSB), a hypertransport (HT) interconnection, an industry standard architecture (ISA) bus, an infinite bandwidth interconnection, a low pin count (LPC) bus, a memory bus, a micro channel architecture (MCA) bus, a peripheral component interconnection (PCI) bus, a PCI-Express (PCI-X) bus, a serial advanced technology attachment (SATA) bus, a Video Electronics Standards Association part (VLB) bus, or other suitable buses, or a combination of two or more thereof. Under appropriate conditions, the bus 510 may include one or more buses 510. Although the present application describes and illustrates a particular bus, the present application considers any suitable buses or interconnections.

When the blade icing state identification apparatus for the wind generator set described in FIG. 5 is implemented by the computing device 500 as shown in FIG. 5, the input device 501 receives the current wind speed and the current rotating speed of the generator set. In a particular embodiment, the I/O interface connected with the output device may include hardware, software or both and provides one or more interfaces for the communication between the computing device 500 and one or more I/O devices. Under appropriate conditions, the computing device 500 may include one or more of these I/O devices. One or more of these I/O devices may allow the communication between a person and the computer system 500. By way of example, rather than limiting, the I/O device may include a keyboard, a keypad, a microphone, a monitor, a mouse, a printer, a scanner, a loudspeaker, a still camera, a contact pin, a handwriting board, a touch screen, a trackball, a video camera, another suitable I/O device, or a combination of two or more thereof. The I/O device may include one or more sensors. The embodiment of the present application considers any suitable I/O devices and any suitable I/O interfaces applicable to the apparatus. Under appropriate conditions, the I/O interface may include one or more devices or software drivers capable of allowing the processor 503 to drive one or more of these I/O devices. Under appropriate conditions, the I/O interface may include one or more I/O interfaces. Although the embodiment of the present application describes and illustrates specific I/O interfaces, the embodiment of the present application considers any suitable I/O interface. Based on the computer executable instructions stored in the memory 504, the processor 503 obtains the current wind speed and the current rotating speed of the wind generator set, compares them with the preset wind speed threshold and the preset rotating speed threshold respectively, progressively increases the blade icing possibility index when the current wind speed is greater than the preset wind speed threshold and the current rotating speed of the wind generator set is smaller than the preset rotating speed threshold, and otherwise, progressively decreases the blade icing possibility index. Then, the icing state identification result may be output via the output port 505 and the output device 506.

That is to say, the blade icing state identification apparatus for the wind generator set according to the embodiment of the present application may be implemented to include the memory 504 for storing the computer executable instructions and the processor 503 for implementing the blade icing state identification method for the wind generator set and the blade icing state identification apparatus for the wind generator set described in combination with FIG. 3 and FIG. 4 when executing the computer executable instruction.

Under appropriate conditions, the computer executable instruction may include one or more semiconductor-based or other integrated circuits (ICs) (for example, a field programmable gate array (FPGA) or an specific IC (ASIC)), hard disk drives (HDDs), hybrid hard disk drives (HHDs), optical disks, optical disk drives (ODDs), magneto-optical disks, magneto-optical disk drives, floppy disks, floppy disk drives (FDDs), magnetic tapes, holographic storage media, solid state drives (SSDs), RAM drives, secure digital cards or drives or other suitable computer readable non-transitory storage media or a combination of two or more thereof.

What is claimed is:

1. A blade icing state identification method for a wind generator set, comprising:
   presetting a wind speed threshold and a rotating speed threshold;
   instructing a farm-level energy management platform or a wind farm controller to use the rotating speed threshold as a lower limit value of a maximum limited rotating speed of the wind generator set operating under a limited power condition;
   periodically obtaining a current wind speed and a current rotating speed of the wind generator set;
   comparing the current wind speed and the current rotating speed of the wind generator set with the preset wind speed threshold and the preset rotating speed threshold respectively;
   progressively increasing a blade icing possibility index having a preset initial value when conditions that the current wind speed is greater than the preset wind speed threshold and the current rotating speed of the wind generator set is smaller than the preset rotating speed threshold are met;
   progressively decreasing the blade icing possibility index when said conditions are not met; and
   determining that blades are in an icing state when the blade icing possibility index is greater than a preset index, the preset index being a threshold for determining whether the blades are in the icing state,
   wherein the preset rotating speed threshold is greater than a minimum rotating speed of the wind generator set.

2. The method of claim 1, further comprising:
   monitoring an external environment index of the wind generator set;
   comparing the external environment index with a blade icing induction index of the wind generator set; and
   presetting the wind speed threshold and the rotating speed threshold when it is determined that the external environment index is equal to the blade icing induction index.

3. The method of claim 1, wherein the preset rotating speed threshold is greater than the minimum rotating speed of the wind generator set and is smaller than an intermediate value between the minimum rotating speed and a maximum rotating speed of the wind generator set.

4. The method of claim 1, wherein the preset wind speed threshold is smaller than a wind speed value corresponding to a minimum torque of a constant rotating speed section in which the rotating speed is a preset maximum rotating speed in a torque-rotating speed characteristic curve of the wind generator set under the limited power condition.

5. The method of claim 1, wherein the preset index is determined based on an updating period of the blade icing possibility index.

6. A blade icing state identification apparatus for a wind generator set, comprising:
- a processor;
- a memory configured to store instructions executable by the processor; and
- an interface configured to communicate with a farm-level energy management platform or a wind farm controller,
- wherein the processor is configured to:
- preset a wind speed threshold and a rotating speed threshold;
- instruct, via the interface, the farm-level energy management platform or the wind farm controller to use the rotating speed threshold as a lower limit value of a maximum limited rotating speed of the wind generator set operating under a limited power condition;
- periodically obtain a current wind speed and a current rotating speed of the wind generator set;
- compare the current wind speed and the current rotating speed of the wind generator set with the preset wind speed threshold and the preset rotating speed threshold respectively;
- progressively increase a blade icing possibility index having a preset initial value when conditions that the current wind speed is greater than the preset wind speed threshold and the current rotating speed of the wind generator set is smaller than the preset rotating speed threshold a met;
- progressively decrease the blade icing possibility index when said conditions are not met; and
- determine that blades are in an icing state when the blade icing possibility index is greater than a preset index, the preset index being a threshold for determining whether the blades are in the icing state,
- wherein the preset rotating speed threshold is greater than a minimum rotating speed of the wind generator set.

7. The apparatus of claim 6, wherein the processor is further configured to monitor an external environment index of the wind generator set, compare the external environment index with a blade icing induction index, and preset the wind speed threshold and the rotating speed threshold when it is determined that the external environment index is equal to the blade icing induction index.

8. The apparatus of claim 6, wherein the preset rotating speed threshold is greater than the minimum rotating speed of the wind generator set and is smaller than an intermediate value between the minimum rotating speed and a maximum rotating speed of the wind generator set.

9. The apparatus of claim 6, wherein the preset wind speed threshold is smaller than a wind speed value corresponding to a minimum torque of a constant rotating speed section in which the rotating speed is a preset maximum rotating speed in a torque-rotating speed characteristic curve of the wind generator set under the limited power condition.

10. The apparatus of claim 6, wherein the preset index is determined based on an updating period of the blade icing possibility index.

* * * * *